Oct. 10, 1950  P. J. ROWE  2,525,242

MANUFACTURE OF CUPRIC HYDRATE

Filed July 10, 1946

PERCY J. ROWE  INVENTOR.

BY William H Brown

Patented Oct. 10, 1950

2,525,242

UNITED STATES PATENT OFFICE 2,525,242

MANUFACTURE OF CUPRIC HYDRATE

Percy J. Rowe, Hubbell, Mich., assignor to Lake Chemical Company, Calumet, Mich., a corporation of Michigan Application July 10, 1946, Serial No. 682,465

2 Claims. (Cl. 23—147)

This invention relates to methods for preparing cupric hydroxide and has particular reference to processes involving the preparation of a solution containing cupric copper, ammonia and carbon dioxide (herein for convenience called cupric ammonium carbonate) and the precipitation therefrom, by means of an alkali metal hydroxide precipitant, of cupric hydroxide in controlled physical state, especially in the form of a product of low apparent density suitable for fungicide use, the manufacture of copper naphthenate and the like.

I have discovered that by suitably controlling the concentration of the copper in the cupric ammonium carbonate solution, and also suitably controlling certain additional factors, I am able to produce a finely crystalline cupric hydroxide of low apparent density without sacrificing the yield to any extent. That is, I am able to precipitate a suitably high proportion of the copper content of the cupric ammonium carbonate solution in the form of a cupric hydroxide of low apparent density, the material being in the form of very fine crystalline particles and not as a more or less continuous gel, which is the general conception of cupric hydroxide.

This cupric hydroxide is superior to the copper carbonate formerly used as a raw material source of copper in chemical processes for the manufacture of copper compounds because it is as reactive as the finest of copper carbonates, particularly with organic acids, and in all cases is superior in that no foaming due to evolution of $CO_2$ attends the reactions. It has, therefore, distinct advantages in the chemical process industries.

It has also definite high fungicidal action and relatively low phytotoxicity, and has high value as an insoluble copper fungicide, and because of its basic nature can be used as an adjuvant to other fungicides and insecticides.

Figure 1:
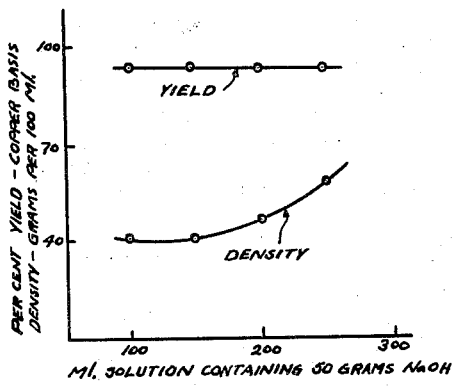
Figure 2:
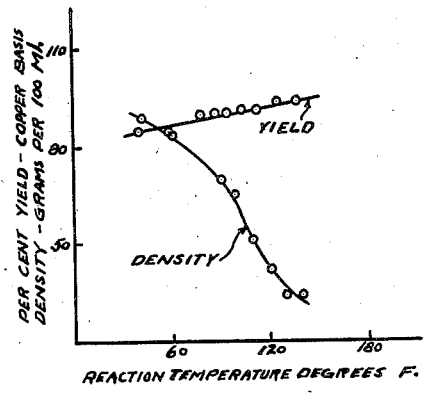
Figure 3:
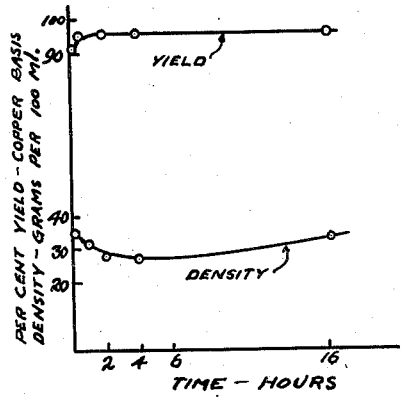
Figure 4:
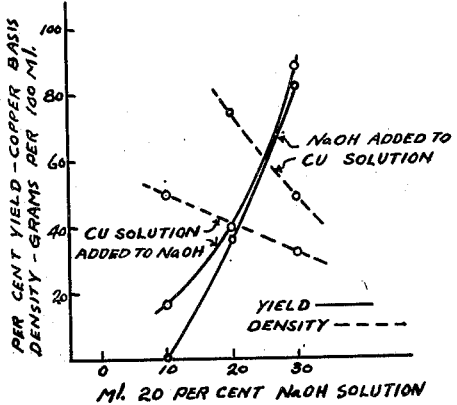

Certain specific examples of the effect of controlling such factors are illustrated in the accompanying drawings, wherein Fig. 1 is a diagram showing the effect of varying the concentration of sodium hydroxide precipitant on the yield and apparent density of the product; Fig. 2 is a diagram showing the effect of temperature on the yield and apparent density; Fig. 3 is a diagram showing the effect on the yield and apparent density of the time during which the precipitate is left in the mother liquor; and Fig. 4 is a diagram showing the effect on yield and apparent density of the method of contacting the copper solution with the precipitant and also showing the effect of the amount of precipitant used. In this connection, it is to be understood that when I refer to apparent density this takes into account the various factors influencing apparent density; such as, fineness and uniformity of particle size and degree of aggregation.

The other factors referred to which are effective at optimum copper concentrations to reduce the apparent density of the product without rendering the yield unsatisfactory are as follows: first, the concentration of the sodium hydroxide (or potassium hydroxide which may be used in equimolecular proportions as a substitute for NaOH) which is used as a precipitant, second, the manner of adding the precipitant, that is, whether the cupric ammonium carbonate is added to the precipitant or vice versa, third, the amount of precipitant solution employed, fourth, the reaction temperature, fifth, the time consumed in completing the mixing of the cupric ammonium carbonate solution with the precipitant, and sixth the length of time the product is left in the mother liquor. I find that it is desirable to select conditions which will result in the precipitation of most but not all of the copper in solution. I regard 95% precipitation as perhaps an optimum but in practice I may operate very satisfactorily on lesser yields, for example 85% to 95%. In order to obtain a high yield, I find it desirable to utilize a copper concentration approaching saturation. This may be varied as will be indicated below. I find it desirable also to maintain in these copper solutions a ratio of essentially two parts of carbon dioxide (grams per liter) to each three parts of $NH_3$ (grams per liter). This corresponds to a mol ratio of 1 mol of $CO_2$ to 3.88 mols $NH_3$.

Working in the range approximating the optimum concentrations of Cu, $CO_2$ and $NH_3$ (which will be defined below), I find that the concentration of the sodium hydroxide solution used as a precipitant has only a slight effect on the yield with respect to copper, but has a more important effect on the apparent density of the product. The sodium hydroxide solution should be fairly concentrated for obtaining the lowest apparent density. It may, for example, vary from about 15% to 50% NaOH on a weight basis and preferably is kept within the range of from 20 to 30%. The quantity of NaOH solution employed may be from 80% to 120% of the quantity theoretically required to precipitate all the copper from the cupric ammonium carbonate solution employed. The reaction temperature has a substantial effect on the yield with respect to copper and a very profound effect upon the density of the resulting product. A desirable temperature range for the reaction is from 80° F. to 140° F., a range from 100° to 120° F. being preferable. The length of time during which the precipitate is allowed to remain in contact with the mother liquor exerts a small but substantial effect on both the yield and the density. Standing for less than one hour, the yield is substantially lower than otherwise, and the apparent density is substantially higher than when the slurry is allowed to stand for a longer time. However, if the precipitate remains in the mother liquor too long, the apparent density again increases. The time of contact is not particularly critical, but when a product having an extremely low density is not required, the time of contact may be reduced to 15 minutes or less, but under these conditions the yield is slightly less, but where coarser crystalline material is required a longer period of contact is desirable, say, 1 to 8 hours. A very substantial lowering of density in a combination of conditions, making for satisfactory yield with respect to copper, can be obtained by adding the cupric ammonium carbonate solution to the sodium hydroxide solution instead of the reverse. The speed of addition of solution to alkali likewise exerts some effect on density and yield; viz., when 500 ml. of cupric ammonium carbonate solution containing 52.7 gpl of copper is added immediately to 150 ml. of 30% NaOH solution, stirred for 5 minutes, then allowed to settle for 30 minutes, the product has an apparent density of 46 grams per hundred milliliters; whereas, when the same volumes are added slowly over a period of 5 minutes, stirred and allowed to settle for 30 minutes, the apparent density of the product is 40 grams per hundred milliliters.

The copper for the preparation of the copper ammonium carbonate solution can be obtained from various grades of copper, either virgin or secondary, also copper clad and copper-containing materials including the cheaper grades of scrap. For some purposes the cheaper forms of scrap are entirely satisfactory while for products of high purity it may be necessary to use selected scrap or even pure metal. Some types of copper-containing materials may contain valuable metals other than copper which are insoluble in ammonium carbonate solution and accordingly are concentrated in a residue from which they may be readily recovered.

To prepare a cupric ammonium carbonate solution suitable for precipitating cupric hydroxide according to the invention I require first a suitable solution of ammonium hydroxide. I may use various concentrations but prefer to produce, by dilution of aqueous ammonia or by absorption of ammonia gas in water, a solution containing about 30 to 100 grams per liter of $NH_3$. I then add $CO_2$ gas to such ammonium hydroxide solution either by bubbling in $CO_2$ gas or by mixing in a tower the ammonium hydroxide solution with the $CO_2$ gas as contained in flue gas from the combustion of coke or in any other feasible manner. I may use ammonium carbonate solutions containing any amount of $CO_2$ up to saturation, but I prefer to use solutions containing a ratio of about 2 parts of $CO_2$ (grams per liter) and 3 parts of $NH_3$ (grams per liter); for example, an ammonium carbonate solution containing 40 grams per liter of $CO_2$ and 60 grams per liter of $NH_3$. While it is possible to make use of an aqueous solution of ammonium carbonate such as might be commercially available or produced by dissolving ammonium carbonate in water, I prefer to make my solution in the foregoing manner as in this way I have practical control of the $NH_3$ to $CO_2$ ratio and it is less expensive. I then add copper to the ammonium carbonate solution and finally add oxygen to form the cupric salt. The copper may be added by contacting the copper metal with the ammonium carbonate solution in a suitable tank or vessel and then bubbling in air or oxygen. Sufficient oxygen should be added to convert all or nearly all the copper which is dissolved by the ammonium carbonate solution to the cupric state. Some cuprous salt can be tolerated but I prefer to use solutions containing as near as practicable 100% of the copper in the cupric state. Various concentrations of cupric ammonium carbonate can be employed but for good yields and a satisfactory product I have found it desirable to use those in which the copper content approaches saturation. To state the desired concentration in another way, it is desirable to employ solutions in which the copper concentration varies from about 50 grams per liter to about 100 grams per liter, $CO_2$ and $NH_3$ varying from about 31 to 63 grams per liter in the case of $CO_2$ and from about 47 to 95 grams per liter in the case of $NH_3$. This would represent a mol ratio of Cu to $CO_2$ of about 1.0 to 0.9 and a mol ratio of Cu to $NH_3$ of about 1 to 3.5.

In respect to the concentration of the sodium hydroxide solution used as a precipitant, the optimum conditions are indicated in Fig. 1 where it will be seen that satisfactorily low density is attained when the solution of sodium hydroxide runs between 15% and 50% while a very satisfactory concentration is between 20% and 30%. If the concentratiton is too high it becomes somewhat viscous and accordingly I prefer to operate in the range of 20% to 30%, that is, in about the upper two thirds of the density curve as seen in Fig. 1. In respect to reaction temperature, its very important effect is illustrated in Fig. 2 where the apparent density curve is seen to drop from about 75 to about 35 grams per 100 cc. as the temperature increases from 80° to 140° F. At the same time the yield increases somewhat so that it is quite feasible to take advantage of the lower density resulting from the elevation of temperature.

In Fig. 3 I have shown the results of a study involving the time during which the precipitate is left in contact with the mother liquor. It will be seen that a standing period of from 1 to 8 hours is beneficial both as to yield and lower density while the maximum benefit is achieved where the standing period is from 1½ to 4 hours. By reference to Fig. 4 it will be seen that very material advantages in lower density of product can be obtained by adding the copper solution to the caustic precipitant instead of the reverse. The heavy lines indicate the yield (using a solution containing 49.5 grams per liter of copper, 31 grams per liter of $CO_2$ and 50 grams per liter of $NH_3$) and since it is desirable to obtain a yield of 85% to 95%, only the extreme upper ends of the heavy lines can be considered to indicate desirable conditions of operation. Considering the highest point on the heavy line indicating the addition of copper solution to the sodium hydroxide solution, it will be seen that the yield is in the order of 90% which is satisfactory and that at this point the corresponding density is of the order of 32 grams per 100 cc. whereas if the precipitant had been added to the copper solution, the yield would be somewhat below 85% while the density would be in the order of 50 grams per 100 cc.

Properly prepared solutions of cupric ammonium carbonate mixed with the proper amount of caustic soda under the optimum conditions as above indicated will yield about 1.1 pound of cupric hydroxide for each pound of caustic (76% $Na_2O$). The amount used is essentially that required to combine with the $CO_2$ present. The precipitates formed can be filtered from the solution and washed to remove sodium and ammonium salts. They can be readily dried at a moderate temperature lower than would convert any of the hydrate to the oxide. However, if the drying temperature is allowed to go too high some of the hydrate will be converted to the oxide. The temperature best suited for drying is a variable depending on the contained moisture, the density etc. It can be stated generally that the drying temperature should not be allowed to go materially higher than 160° F. and at the beginning of the drying it should preferably be considerably lower than 160° F., for example, preferably, not above 130° F. As the moisture in the material is driven off by the drying, the cupric hydrate becomes powdery, and when dry is entirely suitable without further grinding for use in chemical processes and for other purposes. Where extremely fine particle size requirements must be met, the powder consisting of agglomerated particles of finer cupric hydrate crystals may be further broken up by grinding in suitable equipment to the ultimate crystal size required.

After the precipitation, the mother liquor will contain sodium carbonate, a small amount of copper, ammonium carbonate and water. It can be treated by heating the solution sufficiently to drive off the ammonia and any $CO_2$ in excess of that in stoichiometric proportion with the $Na_2O$ content which may be present in the solution. The ammonia and $CO_2$ gases along with water vapor can be condensed, forming aqueous ammonium carbonate. The residual copper can then be precipitated as a compound such as cupric oxide which can be filtered off. The resulting solution, containing sodium carbonate and water, can be treated by adding calcium hydroxide to reform sodium hydroxide. The resulting calcium carbonate precipitate can be removed and burned to produce $CO_2$, which can be absorbed in $NH_3$ solution, and calcium oxide, which, when slaked, reforms calcium hydroxide. It is seen that all reagents, except copper water and air, entering the process are recoverable in a form such that they may be directly returned after suitable adjustment of concentration to the process.

The following specific example will serve to illustrate the invention:

*Example*

An ammonium carbonate solution was prepared by adding $CO_2$ gas to an ammonium hydroxide solution containing 67 grams per liter of $NH_3$. The gassing was continued until the solution contained 40 grams per liter of $CO_2$. The resulting ammonium carbonate solution was contacted with copper metal and air was blown in until the copper content was 64 grams per liter, an analysis at this point showed 64 grams per liter of copper, 40 grams per liter of $CO_2$ and 60 grams per liter of $NH_3$. A sodium hydroxide solution was prepared containing 252 grams per liter of sodium hydroxide. 264 gallons of the cupric ammonium carbonate solution were added to 95 gallons of the sodium hydroxide solution at a temperature of 120 F. with violent agitation, the addition being completed in 90 seconds. The precipitate which formed was allowed to stand in contact with the mother liquor for two hours and then was removed by filtration. The precipitate so produced was dried at 120° F. for 10 hours and then at 160° F. for 3 hours until there was no further loss of weight. The product was found to be a cupric hydroxide having an apparent density of 35, that is, a 100 ml. graduate filled to the 100 ml. mark with the material as tightly as would result from tapping the graduate on a table top weighed 35 grams.

Having thus described my invention, what I claim is:

1. A process of producing cupric hydroxide in the form of a finely divided, light fluffy powder of apparent density less than about 65 grams per 100 cc., said process including the steps of (1) preparing an aqueous solution of cupric ammonium carbonate containing from 50 to 100 grams per liter of Cu, 31 to 63 grams per liter of $CO_2$, and 47 to 95 grams per liter of $NH_3$; (2) adding said aqueous solution to an aqueous solution of NaOH containing from 15% to 50% NaOH by weight, the quantity of NaOH solution employed being from 80% to 120% of the quantity theoretically required to precipitate all the copper from the cupric ammonium carbonate solution employed, the temperature of the reaction mixture being maintained within the range from 100° F. to 120° F.; and (3) separating the precipitate from the liquid portion of the reaction mixture.

2. A process of producing cupric hydroxide in the form of a finely divided, light fluffy powder of apparent density less than about 65 grams per 100 cc., said process including the steps of (1) preparing an aqueous solution of cupric ammonium carbonate containing from 50 to 100 grams per liter of Cu, 31 to 63 grams per liter of $CO_2$, and 47 to 95 grams per liter of $NH_3$; (2) adding said aqueous solution to an aqueous solution of NaOH containing from 15% to 50% NaOH by weight, the quantity of NaOH solution employed being from 80% to 120% of the quantity theoretically required to precipitate all the copper from the cupric ammonium carbonate solution employed, the temperature of the reaction mixture being maintained within the range from 100° F. to 120° F.; (3) allowing the resulting precipitate to stand for a period of from 1 to 8 hours in contact with the liquid portion of the reaction mixture; and (4) separating the precipitate from said liquid portion of the reaction mixture.

PERCY J. ROWE.

REFERENCES CITED

The following references are of record in the file of this patent:

UNITED STATES PATENTS

| Number | Name | Date |
|---|---|---|
| 1,867,357 | Furness | July 12, 1932 |

OTHER REFERENCES

J. W. Mellor's, "A Comprehensive Treatise on Inorganic and Theoretical Chemistry," vol. 3, 1923 ed., pp. 143, 144. Longmans, Green and Co., N. Y., publishers.

McPherson and Henderson, "A Course in General Chemistry," 1927 ed., p. 618. Ginn and Co., N. Y., publishers.